US010596746B1

(12) United States Patent
Paradies

(10) Patent No.: US 10,596,746 B1
(45) Date of Patent: Mar. 24, 2020

(54) HOUSE WRAP AND METHOD OF MANUFACTURE

(71) Applicant: R.H. Tamlyn & Sons, Inc., Stafford, TX (US)

(72) Inventor: Christopher Paradies, Tampa, FL (US)

(73) Assignee: R. H. Tamlyn & Sons, Stafford, TX (US)

( * ) Notice: Subject to any disclaimer, the term of this patent is extended or adjusted under 35 U.S.C. 154(b) by 0 days.

(21) Appl. No.: 15/455,537

(22) Filed: Mar. 10, 2017

Related U.S. Application Data

(60) Provisional application No. 62/306,857, filed on Mar. 11, 2016.

(51) Int. Cl.
*B29C 51/08* (2006.01)
*B29C 51/46* (2006.01)
*E04B 1/62* (2006.01)
*B29L 31/00* (2006.01)

(52) U.S. Cl.
CPC .............. *B29C 51/08* (2013.01); *B29C 51/46* (2013.01); *E04B 1/625* (2013.01); *B29K 2995/0069* (2013.01); *B29L 2031/755* (2013.01); *Y10T 428/24* (2015.01); *Y10T 428/24058* (2015.01); *Y10T 428/24074* (2015.01)

(58) Field of Classification Search
CPC ......... B29C 51/08; B29C 51/46; E04B 1/625; Y10T 428/24; Y10T 428/24058; Y10T 428/24074; Y10T 428/24355; Y10T 428/24752; B29L 2031/755; B29K 2995/0069

USPC .................. 428/98, 105, 107, 108, 141, 189
See application file for complete search history.

(56) References Cited

U.S. PATENT DOCUMENTS

| 2,724,872 A | | 11/1955 | Herbes | |
|---|---|---|---|---|
| 3,321,348 A | * | 5/1967 | Rupp | D04H 3/04 139/DIG. 1 |
| 3,511,739 A | * | 5/1970 | Hebberling | B29C 70/16 156/177 |
| 3,553,064 A | * | 1/1971 | Wideman | D04H 1/66 156/73.6 |
| 3,598,166 A | * | 8/1971 | Wells | B29D 30/3035 152/526 |
| 3,720,569 A | * | 3/1973 | Kimble | B29D 30/3035 428/108 |
| 3,720,570 A | * | 3/1973 | Greene et al. | B29D 30/3035 428/112 |
| 4,161,559 A | * | 7/1979 | Bosse | B29C 66/721 428/110 |
| 4,325,999 A | * | 4/1982 | Campman | D04H 3/04 156/181 |
| 4,398,650 A | * | 8/1983 | Holmes | B65D 5/441 156/177 |
| 5,002,621 A | * | 3/1991 | Ikeda | B29C 70/16 156/177 |

(Continued)

*Primary Examiner* — David Sample
*Assistant Examiner* — Donald M Flores, Jr.
(74) *Attorney, Agent, or Firm* — Christopher Paradies; Paradies Law P.A.

(57) ABSTRACT

A continuous, serpentine and intersecting pattern of filaments is provided on a surface of a house wrap membrane. Water drainage channels may be provided by depressions or viaducts formed at locations along filaments. The filaments may be formed using hot melt nozzles disposed on a member and translated transversely as the membrane is translated longitudinally beneath the nozzles.

11 Claims, 5 Drawing Sheets

(56) References Cited

U.S. PATENT DOCUMENTS

| | | | |
|---|---|---|---|
| 6,323,145 B1 * | 11/2001 | Popper | A41D 31/0061 442/366 |
| 6,869,901 B2 | 3/2005 | Lubker, II | |
| 7,607,270 B2 | 10/2009 | Ehrman et al. | |
| 7,858,174 B2 | 12/2010 | Ehrman et al. | |
| D657,958 S | 4/2012 | Ehrman et al. | |

* cited by examiner

HOUSE WRAP AND METHOD OF MANUFACTURE

CROSS RELATED APPLICATIONS

This application claims priority to U.S. Provisional Application 62/306,857, with the same title and inventor, filed on Mar. 11, 2016, which is hereby incorporated by reference in its entirety.

FIELD OF THE INVENTION

The field relates to a membrane for wrapping residential and commercial construction, which allows humidity to escape but prevents water from passing through the membrane and its method of manufacture.

BACKGROUND

House wraps are known. U.S. Pat. Nos. 7,607,270 and 7,858,174 was filed Aug. 16, 2006 and published Feb. 21, 2008. The reference teaches separately bonded and spaced apart filaments that do not intersect stretched longitudinally along a house wrap membrane. This strengthens the membrane longitudinally but fails to strengthen the membrane transverse to the longitudinal direction.

U.S. Pat. No. 6,869,901 describes a protective drainage wrap used to protect against air infiltration and moisture build-up in buildings which include cross-woven or cross-laminate filaments. This increases the strength of the membrane both longitudinally and transersely, but the filaments tend to cause pooling of condensation or water penetrating a facing material. U.S. Pat. No. 2,724,872 describes longitudinal strips that are not continuous and do not strengthen a membrane either longitudinally or transversely by does allow for water drainage between the short strips. U.S. Design Pat. No. D657,958 illustrates an ornamental serpentine, spaced apart, and non-intersecting array of dashed filaments, which does not strengthen the membrane.

None of these issued patents have any teaching of continuous, serpentine, intersecting filaments that can be added to a membrane in a continuous or semicontinuous method.

SUMMARY

A house wrap comprises a membrane and a pattern of continuous, raised polymer strands that extend from one side of the membrane of the house wrap to an opposite side of the membrane, as a wavy, intersecting pattern on a surface of the membrane.

In one example, a portion of the raised polymer strands are comparatively flattened or absent for a distance along the strands to allow for drainage. Even if a portion of a strand is removed or omitted, an intersecting, wavy continuous pattern may provide continuous reinforcement to the underlying membrane of the housewrap. In one example, a plurality of flattened portions are disposed at intersecting points between two raised, continuous and wavy strands. In another example, flattened portions may be provided at a deflection region, such as the deflection region at one and/or the opposite side of the membrane. If the housewrap is installed longitudinally along a building exterior, then the one and/or the opposite side of the membrane will become the top or bottom of the housewrap. Thus, a flattened portion at the deflection point prevents any significant accumulation of water at the deflection region, providing a drainage channel for water that could otherwise accumulate at the deflection region.

Alternatively, the strand may be made such that a bridge and viaduct under the bridge is formed. For example, a substance soluble in a solvent, such as water or alcohol, may be deposited on a surface of the membrane, prior to depositing a comparatively insoluble continuous strand over the soluble substance. Then, the soluble substance may be dissolved by dipping or spraying the solvent on the membrane, leaving a "via" or viaduct channel beneath the strand.

For example, raised portions of the strand prevent contact of any facing material or exterior treatment onto the surface of the membrane, protecting the surface of the membrane for inadvertent damage during installation or wear and tear by any thermal or humidity derived expansion and contraction differences between the substrate and the facing material or exterior treatment of the building.

Flattened portions or bridges formed in the raised strands provide channels for draining of condensation or any water penetrating the facing material, preventing any significant accumulation of water between the membrane and the facing material or exterior treatment.

In a method of manufacturing, a layer of a membrane suitable for a house wrap is drawn longitudinally, such as between two rolls, while hot melt nozzles deposit raised strands on a membrane surface of the house wrap. The hot melt nozzles are controlled positionally and temporally, such that hot melt may be deposited when and where the hot melt nozzle is in disposed above the membrane surface. For example, each nozzle may be controlled independently by a 2-D or 3-D position controller or a combination of nozzles may be attached to a structural member, under control of a position controller. In one example, a plurality of hot melt nozzles are disposed longitudinally along a rigid structural member, and the structural member is controlled by a 1-D, bi-directional controller, such that the nozzles are displaced from one side of a membrane to the opposite side of the membrane and back again. By controlling the rate of the displacement of the nozzles and the rate that the membrane is pulled beneath the nozzles, any continuous way of hot melt may be deposited onto the surface of the membrane facing the nozzles. In one example, hot melt extrusion through the nozzles is controlled temporally, such that the extrusion of hot melt from each nozzle is controlled independently. For example, extrusion from each nozzle may be turned on or off at any point along the path that the nozzle takes with respect to the membrane. Thus, hot melt may be extruded only when the nozzle is over the membrane or extrusion may be turned off to provide gaps through which water may drain.

In one example, a house wrap comprises a membrane having a beginning, an end, a first side extending between the beginning and the end, and a second side, opposite of the first side, the second side extending between the beginning and the end, and the beginning, the first side, the end and the second side defining a perimeter, the perimeter defining a surface area of the membrane, and the surface area of the membrane comprises a top surface and a bottom surface, opposite of the top surface; and a pattern of a plurality of wavy, intersecting and raised polymer strands adhered to the top surface of the membrane and raised above the top surface of the membrane, each of the plurality of wavy, intersecting and raised polymer strands comprising a polymer strand extending between the first side of the membrane and the second side of the membrane, at a first angle, such that an initial portion of the polymer strand nearest to the first side of the membrane is at a distance from the end of the membrane greater than a portion of the polymer strand nearest to the second side of the membrane, and the portion of the polymer strand nearest to the second side of the membrane forms a local minima, reversing direction of the polymer strand back toward the first side of the membrane at a second angle in a direction away from the local minima, whereby the polymer strand of each of the plurality of wavy, intersecting and raised polymer strands appears wavy, and each of the plurality of wavy, intersecting and raised polymer strands are offset one from the other by an offset starting distance such that each of the wavy, intersecting and raised polymer strands intersect with each of the other wavy, intersecting and raised polymer strands at intersection points, each of the intersection points being defined by the crossing of the polymer strand of one of the plurality of wavy, intersecting and raised polymer strands and the polymer strand of another of the plurality of wavy, intersecting and raised polymer strands, whereby the plurality of wavy, intersecting and raised polymer strands form the pattern of the plurality of wavy, intersecting and raised polymer strands. A water drainage channel may be provided for water drainage by a length of a comparatively flattened portion of the polymer strand of at least one of the plurality of wavy, intersecting and raised polymer strands. Alternatively (or in addition), a water drainage channel is provided by a gap along a length of the polymer strand of at least one of the plurality of wavy, intersecting and raised polymer strands, while the pattern of the plurality of wavy, intersecting and raised polymer strands remains continuous from a location that the begins adjacent to the beginning of the membrane to a location that the pattern ends adjacent to the end of the membrane. This is not contradictory, because a hot melt polymer may be deposited such that interconnection points fuse together to form a continuous web of polymer strands, even if one or more of the polymer strands have gaps for water drainage.

For example, the pattern may be a continuous pattern of interconnecting polymer strands from a location that begins near the beginning of the membrane to a location that ends near the end of the membrane. A length of a comparatively flattened portion of a polymer strand (or an omitted portion or drainage channel under a "bridge") may be disposed at local minima, whereby a path for water drainage is provided at the local minima, for example.

In one example, a pattern of the plurality of wavy, intersecting and raised polymer strands comprises a bridge or bridges. The bridges may be defined by a length of a portion of the polymer strand raised above the top surface of the membrane such that a water drainage channel is provided by a gap between the bridge of the polymer strand and the top surface of the membrane. While a raised polymer strand may be raised by its thickness, alone, while in contact with the top surface of the membrane, due to selection of temperature, pressure and type of hot melt polymer, for example, a bridge is raised such that the bottom of the polymer strand is not in contact with the top surface of the membrane until after the polymer strand solidifies, for example.

A plurality of wavy, intersecting and raised polymer strands may comprise any number of individual strands, such as four polymer strands. In one example, a continuous polymer strand comprises a subsequent portion of the polymer strand extending toward the first side of the membrane that reverses direction of the polymer strand back toward the second side of the membrane, defining a local maximum. The polymer strand may repeat minima and maxima from side to side in order to form a continuous strand from beginning to end of the membrane. Alternatively, a pattern may be continuous even if any particular strand or strands are not, because interconnection points can form an interconnected, continuous web of polymer strand segments that are capable of reinforcing and protecting the more delicate membrane material.

Herein an angle may be defined by the intersection between a first imaginary line extending normal to either side of the membrane through local minima or maxima of the polymer strand and a second imaginary line extending from the local minima or maxima to the next local maximum or minimum. This will necessarily result in an acute angle. The acute angle may be the same for both directions. For example, an angle may be selected in a range from 10 degrees to 50 degrees. In one example, the acute angle is selected in a range from 20 to 40 degrees to provide optimal numbers of raised polymer strands for protecting and reinforcing a membrane. Depending on the number of strands, the offset spacing between strands and the length of the membrane, any acute angle will form a web of polymer strands.

In one example, bridge and viaduct below the bridge is formed by depositing a water soluble substance on the top surface of the membrane prior to depositing a portion of the polymer strand over the water soluble substance. Alternatively, a gap or viaduct may be formed, in situ, when water dissolves water soluble substance during or after installation of the house wrap on a wall of the house. Other substances may be used that are soluble in solvents other than water. Any of these soluble substances may be dissolved prior to installation by spraying or dipping the membrane in the solvent.

The pattern of wavy strands may be defined by a closed geometric shape, wherein three intersection points define three vertices of the geometric shape, a left vertex, a center vertex and a right vertex. An arc disposed opposite of the center vertex may close the geometric shape, either by passing through the left and right vertices or by passing through line segments extending from the left or right vertices.

A method of making a house wrap, comprises drawing a layer of a membrane suitable for use as a house wrap, longitudinally; while drawing, depositing a polymer strand of a hot melt polymer from a hot melt nozzle or nozzles onto the top surface of the membrane; controlling, positionally and temporally, the depositing of hot melt polymer from the hot melt nozzle or nozzles such that a plurality of wavy, intersecting and raised polymer strands are deposited onto the top surface of the membrane in a pattern, wherein each of the polymer strands extends between a first side of the membrane and a second side of the membrane, at a first angle, such that an initial portion of the polymer strand nearest to the first side of the membrane is at a distance from the end of the membrane greater than a portion of the polymer strand nearest to the second side of the membrane, and the portion of the polymer strand nearest to the second side of the membrane forms a local minima, reversing direction of the polymer strand back toward the first side of the membrane at a second angle in a direction away from the local minima, whereby the polymer strand of each of the plurality of wavy, intersecting and raised polymer strands appears wavy, and each of the plurality of wavy, intersecting and raised polymer strands are offset one from the other by an offset starting distance such that each of the wavy, intersecting and raised polymer strands intersect with each of the other wavy, intersecting and raised polymer strands at intersection points, each of the intersection points being defined by the crossing of the polymer strand of one of the plurality of wavy, intersecting and raised polymer strands and the polymer strand of another of the plurality of wavy, intersecting and raised polymer strands, whereby the steps of depositing and controlling form the pattern of the plurality of wavy, intersecting and raised polymer strands.

For example, the step of depositing uses a plurality of nozzles, and the step of controlling controls the plurality of nozzles. The step of controlling may fix the plurality of nozzles to a common nozzle member, and a position controller may move the plurality of nozzles, together, at the same time. An offset distance between each of the plurality of nozzles may be selected or an offset time for depositing of the hot melt polymer may be selected or both a combination of an offset distance between each of the plurality of nozzles and an offset time for depositing of the hot melt polymer from each of the plurality of nozzles may be selected, such that the pattern of the plurality of wavy, intersecting and raised polymer strands is deposited and adhered onto the top surface of the membrane. In one example, a flattening device is positioned, such that the flattening device flattens at least one portion of at least one polymer strand, such that water drainage channels are provided over or through which water drains. The step of positioning may support a plurality of rollers or wheels using a support member such that the rollers or wheels are disposed in a spatial relation across the width of the membrane and a plurality of polymer strands are flattened by the plurality of rollers or wheels. Alternatively, flatteners, such as rollers, wheels, knives and the like, may be controlled by robots or other positioners that can independently position these flattening tools.

In one example a substance soluble in a solvent is deposited onto the top surface of the membrane prior to the step of depositing the strand. During the step of depositing a portion of at least one polymer strand may be deposited over the substance soluble in a solvent, for example. The viaduct or gap may be formed by dissolving the substance soluble in a solvent prior to installation or in situ. Prior to the step of disposing, the substance soluble in the solvent may be selected as a water soluble substance. By leaving the water soluble substance until after installation, the bridges are reinforced during handling and installation. The water soluble substance may dissolve in situ, whenever any accumulation of water dissolves the water soluble substance and drains from drainage channels below the bridges.

In one method one or more rolls or wheels are disposed downstream of the hot melt extrusion, such that the hot melt is flattened by the rolls or wheels rolling over the raised bead of hot melt, before the raised bead of hot melt fully solidifies. For example, this may be used to form flattened regions anywhere along the strand of extruded hot melt including at intersection points of strands. In one example, the roller or wheel is positionable under control of a computerized controller and may be shifted up or down and/or from one side to the opposite side of the membrane. Alternatively, the roller or wheel may be positioned manually. In one example, a plurality of rollers or wheels are supported by a cross member and are disposed in a spaced relation across the width of the membrane.

BRIEF DESCRIPTION OF THE DRAWINGS

The following drawings are illustrative examples and do not further limit any claims that may eventually issue.

When the same reference characters are used, these labels refer to similar parts in the examples illustrated in the drawings.

DETAILED DESCRIPTION

Figure 1:
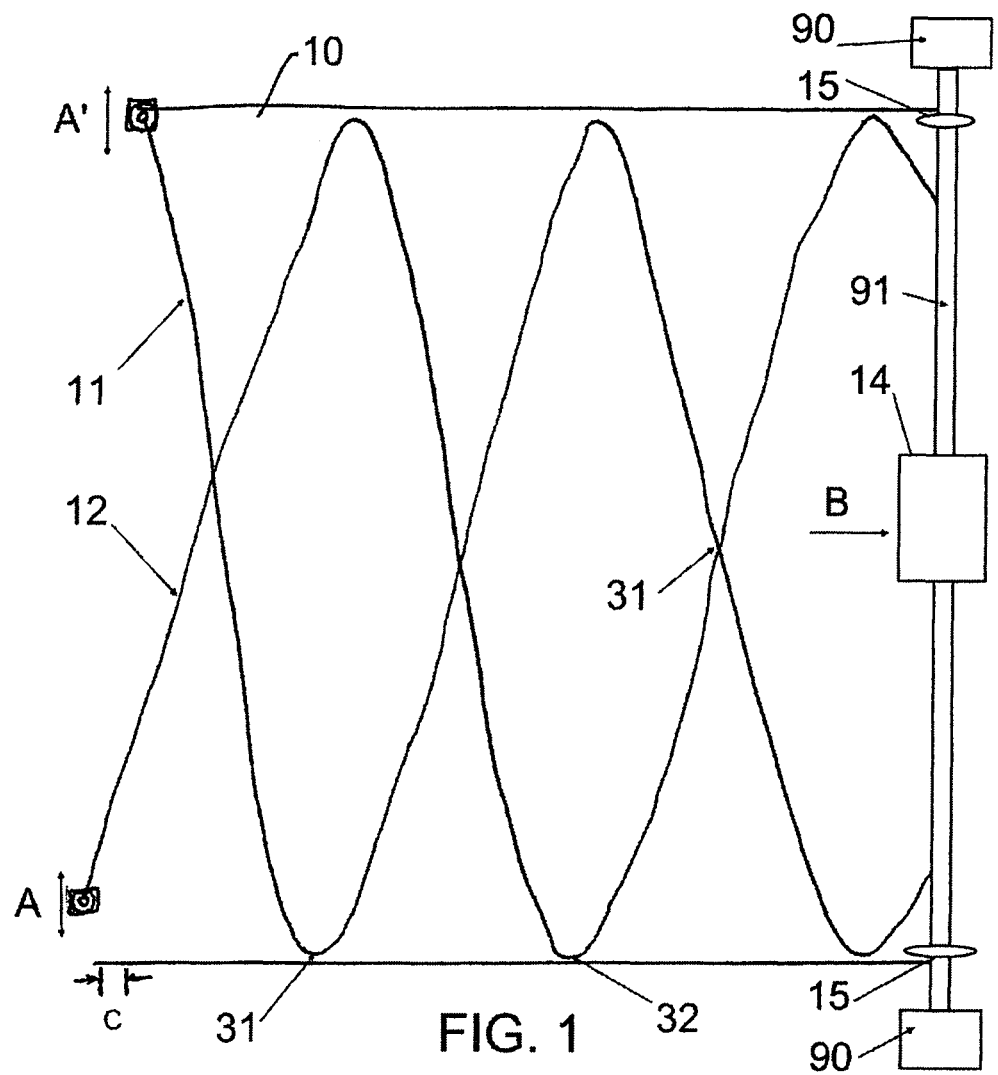
FIG. 1 illustrates an example of a serpentine pattern of continuous filaments that intersect on a housewrap and wheels for flattening portions of raised strands deposited on a membrane in the serpentine pattern.
Figure 5:
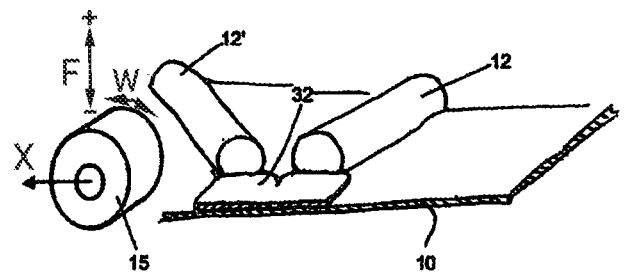
FIG. 5 illustrates a perspective, detailed view of a portion of a serpentine pattern, showing a flattened portion of the filament a deflection region.

In one example, such as the illustration in FIG. 1, a plurality of continuous filaments or strands intersect each other. Each raised strand forms a serpentine pattern bonded to a surface of a membrane of a house wrap. The membrane may be any of the well known membranes, such as a Tyvek house wrap (Tyvek is a trademark of Dupont). For example, FIG. 1 illustrates an example of two filaments 11, 12 that alternatingly serpentine along a longitudinal direction of house wrap membrane. The two filaments intersect along a center line region 13 of the house wrap membrane and are bonded to the surface of the membrane. The region for intersection may be controlled along a line (CL) plus or minus a distance (+Z or −Z). In one example, control allows a comparatively narrow wheel 14 to be used to flatten an intersecting portion of the two filaments at each intersecting point 31. Alternatively, a wider roller may be used to flatten each intersecting point. Additional wheels 15 or rollers may be positioned to flatten other regions of the raised strands, such as illustrated in FIG. 5, for example, where a deflection region 31, 32 of each raised strand may be flattened, leaving a drainage channel D to prevent any significant accumulation of water at the deflection region.

For example, in FIG. 1, the two filaments may be deposited onto a surface of the membrane 10 from two hot melt nozzles 41, 42 incorporated into a hot melt machine and independently controlled.

Hot melt machinery and parts are used to accomplish a variety of hot melt applications, such as machines made by the Nordson Corporation, for example.

Figure 2:
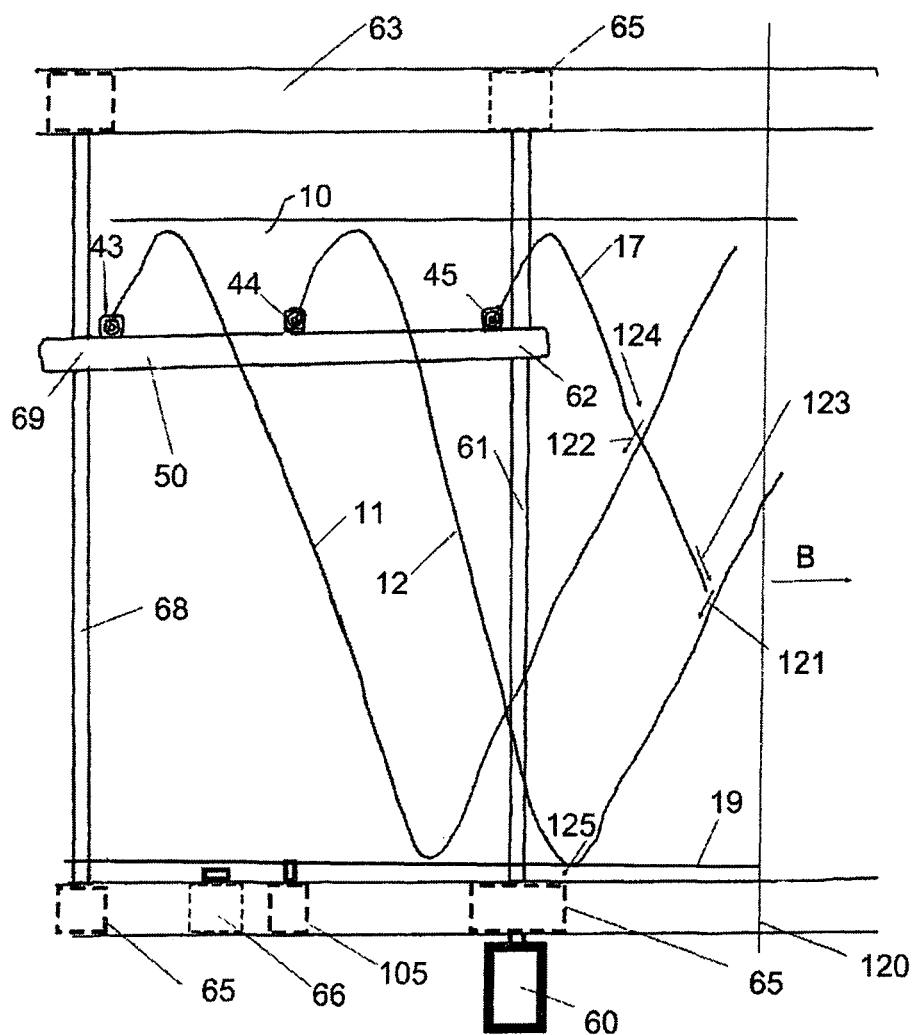
FIG. 2 illustrates another example of a serpentine pattern of continuous filaments that intersect on a housewrap.
Figure 3:
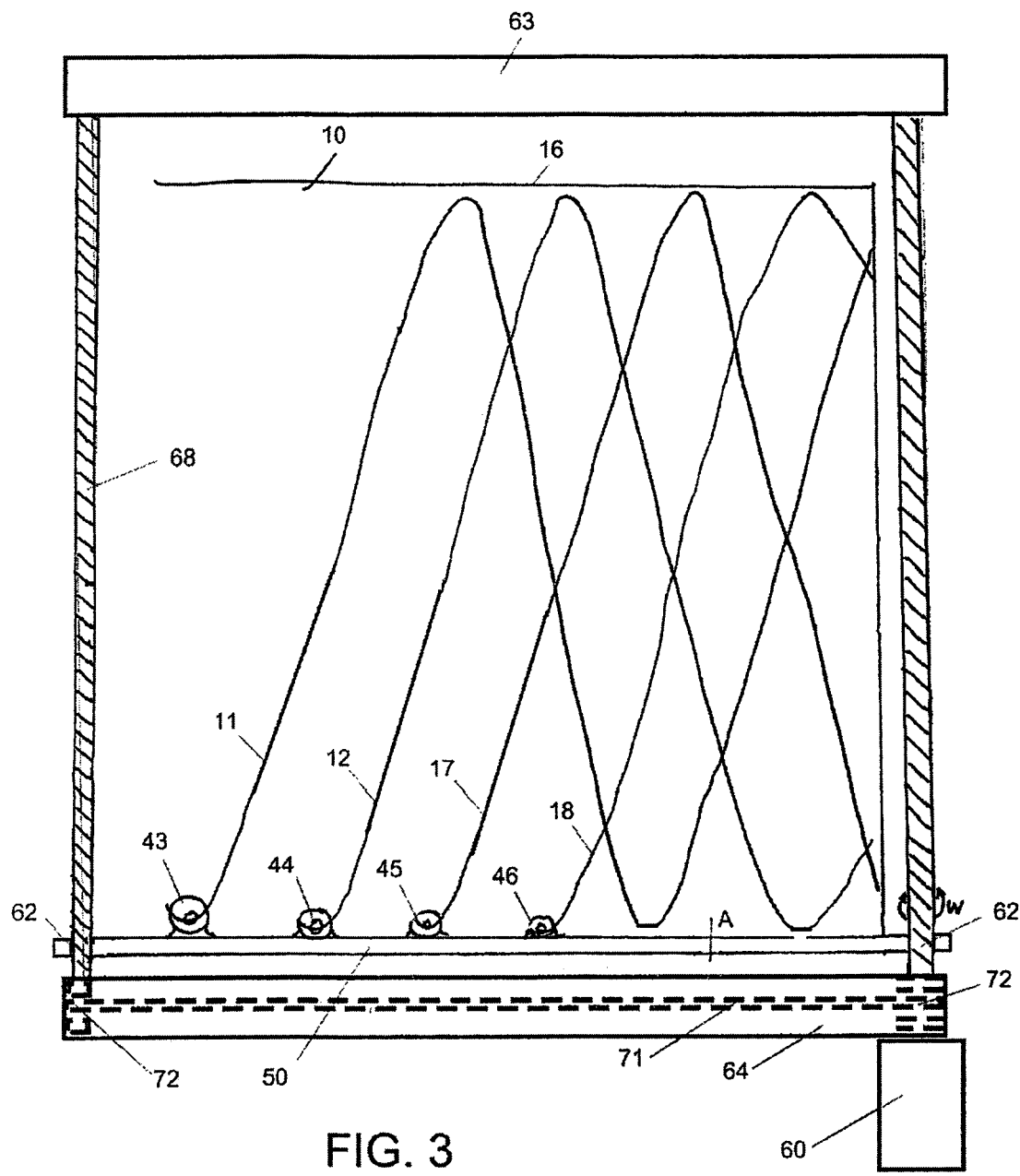
FIG. 3 illustrates yet another example of a serpentine pattern of continuous filaments that intersect on a housewrap.

In other examples, such as in FIGS. 2 and 3, a plurality of continuous filaments 11, 12, 17, 18, greater than two, are bonded to a surface of a membrane 10 in a serpentine, continuous and interconnected pattern from a plurality of hot melt nozzles 43-46 mounted to a rigid structure 50. In each of these examples, each filament extends from one side 16 of a membrane film 10 to an opposite side 19 of the membrane film 10, while also extending longitudinally along the length of the membrane film 10. By "from" and "to" it should be understood that the raised strand approaches but need not reach the one side of the opposite side. Instead, "from" and "to" may be understood as meaning the raised strands extend continuously across substantially all of the width of the membrane, leaving a narrow border free of hot melt filaments.

Melters, hot melt adhesive hoses and other hot melt parts may be coupled in a machine to connect to the plurality of nozzles for depositing continuous filaments of hot melt polymer as a raised filament bonded to the surface of a membrane. For example, hot melt filaments may be made of ethylene vinyl acetate copolymers or EVA, among them are styrene-isoprene-styrene (SIS copolymers), styrene-butadiene-styrene (SBS copolymers), and ethylene ethyl acrylate copolymers (EEA), which may be mixed with a variety of plasticizers, waxes, and resins that optimize performance. In one example, the hot melt adhesive is a polyurethane reactive (PUR), which sets up rapidly, rapidly meaning in mere seconds, and then is rigid in a matter of minutes, which makes it particularly useful for creating continuous filaments and for forming flattened portions in the continuous filaments. More than a few seconds may be provided between deposition of the hot melted PUR and the flattening of the hot melted PUR by a wheel. By flattening the hot melted PUR before it becomes entirely rigid, a non-stick or non-stick coated wheel may be used to flatten the strands, rather than resorting to higher pressure and/or temperature rollers. For example, a plurality of flattening wheels 14, 15 may be rotatably mounted to a support arm 91 supported by a pair of fixed supports 90. One or more may be positionable in a transverse direction E to the longitudinal direction of travel B of the membrane 10, for example.

In FIG. 2, three nozzles 43-45 are disposed longitudinally along a rigid member 50. The rigid member 50 is elongated in the longitudinal direction and is coupled to a position controller 60 comprising a motor and a positioning mechanism. For example, the positioning mechanism may comprise a threaded screw 61 and a matingly threaded block 62, which moves along the screw 61 as the screw is rotated clockwise or counterclockwise. A rigid support frame 63, 64 may be fixedly mounted and may be coupled to the screw by roller bearings 65, for example. Alternatively, a rod 61 may be unthreaded and may merely guide the rigid member 50 under control of a mechanical arm or cable positioner, for example. Preferably, the controller 60 includes a positive feedback for determining the position of the hot melt nozzles, at least intermittently, such as a limit switch 66 or the like. For example, it is known to include a sensor for determining when a motor makes a complete revolution about an axis for determining the location of a block 62 on a screw 61. Combination of a positive feedback switch 66 and a sensor provides positive feedback for ensuring that the sensor is operating properly. Also, one or more limit switches 66 may prevent the controller 60 from continuing beyond a point where damage to equipment or injury to an operating may occur. In one example, one or more rods 68 and roller bearings 69 are added for structural stability and to prevent binding during translation of the nozzles 43-45 back and forth across the membrane 10.

In the example of FIG. 3, a chain 71 and chain drive gears 72 positively couple threaded rods 61, 68 to the rigid member 50. The rigid member 50 is positionable in a back and forth transverse direction A relative to a longitudinal direction of movement B of an underlying membrane 10.

Figure 4:
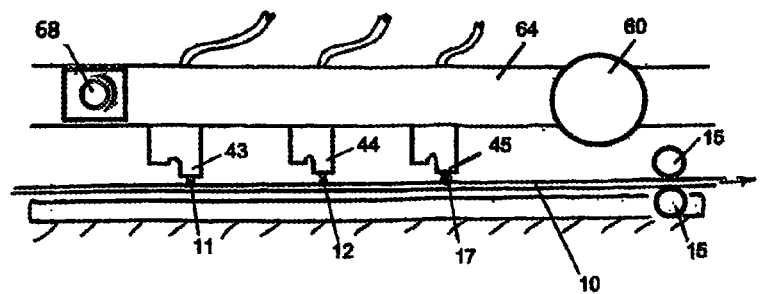
FIG. 4 illustrates a side view of a machine for creating a serpentine pattern of continuous filaments that intersect.

In FIG. 4, an example of a machine is shown. A plurality of nozzles are disposed in a line along rigid member, wherein the rigid member is translatable transversely across the surface of membrane, as the membrane is translated longitudinally. Each nozzle may begin ejecting hot melt material independently; therefore, a continuous filament of hot melt may be provided by each nozzle in turn, such that a pattern of intersecting, serpentine, continuous filaments is disposed onto the surface of the membrane. For example, two filaments are disposed on a surface as shown in FIG. 1 by activating a first nozzle 1 and a third nozzle 3 in turn, while translating the membrane in a longitudinal direction and translating the rigid member transversely first in one transverse direction and then in a second transverse direction.

FIG. 4 shows a side view of a plurality of rollers 15, each roller 15 may be able to be raised or lowered in an up and down direction F and moved transversely, as needed, even while continuing to rotate in a rotational direction W+ or W−. The rollers 15 flatten only a portion of the filaments. For example, one roller 15 may be disposed along a center line region CL of a membrane 10. For example, FIG. 5 represents a partial detail view of a flattened region, which may be either a center line CL region or a deflection region 31, 32. This partial, detail view would look the same in both regions, with a flattened portion 32 and raised portions 12, 12' leaving a gap D between the raised portions 12, 12'. A roller or wheel 15 is shown downstream of the flattened portion 32, after flattening the flattened portion 32. When the roller 15 is disposed in direction X to flatten each point of intersection between a first filament 11 and the second filament 12, one of the raised portions 12' is a portion of the first filament 11 and the other raised portion 12 is the second filament 12. Alternatively, when the raised portions 12, 12' are flattened at a deflection point, then each raised portion 12, 12' is of the same filament 12. Continuity of the filaments strengthen the membrane in every direction while providing for drainage of water. The flattened portions 32 may improve bonding between the filaments and the surface of the membrane, also.

Figure 6:
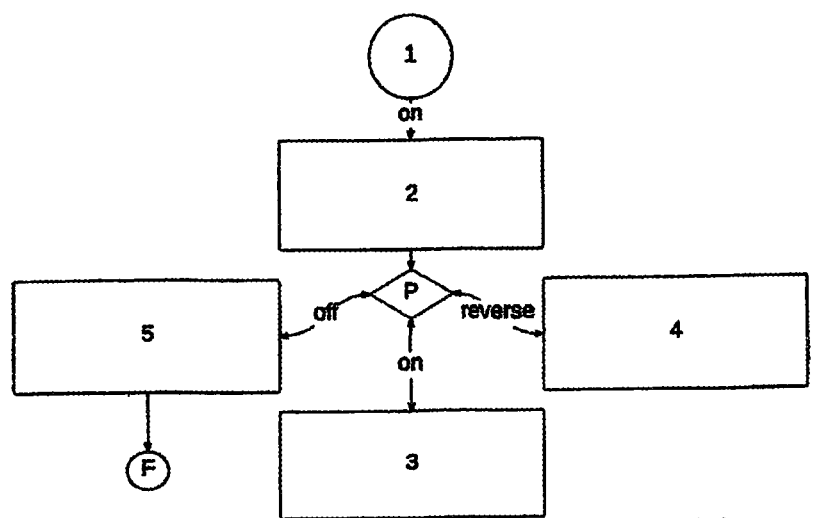
FIG. 6 illustrates a flow chart for a method of creating a serpentine pattern of continuous filaments that intersect.

In FIG. 6, an example of a method of making a membrane with a pattern of continuous, raised polymer strands that extend from one side of the membrane of the house wrap to an opposite side of the membrane, as a wavy, intersecting pattern on a surface of the membrane, is described in relation to a flow diagram. At step 1, a first nozzle 11 is disposed above a surface of a membrane 10. A hot melt is directed to and extruded from the nozzle 11 in step 2, as both the nozzle and the membrane are translated. The membrane may be translated in a first direction B and the nozzle may be translated in a direction A transverse to the direction of the membrane B, as illustrated in FIG. 1, for example. In FIG. 6, a decision loop P monitors the process and determines when control of the nozzles is required. For example, decision loop P determines if an additional nozzle, such as second nozzle 12 in FIG. 1, is disposed over a proximal surface of the membrane 10, or if one or more of the nozzles reaches a side of the membrane 10, or if one or more of the nozzles reaches a distal surface of the membrane 10. This can be determined from sensors, delay circuits, limit switches or a combination of these, for example.

When a second nozzle 12 is disposed over the membrane 10, then hot melt may be directed and extruded from the second nozzle in step 3. For example, an additional nozzle 12 may be disposed at a distance C in the longitudinal direction B from the first nozzle, as illustrated in FIG. 1, for example. Thus, the decision P to commence extruding hot melt from the second nozzle 12 in step 3 may be based on a time delay calculated by the distance C divided by a rate of movement of the membrane 10 in the B direction integrated over time. The integral of (db/dt) from some initial time, t1, which corresponds to the onset of hot melt extrusion from the first nozzle, to some intermediate time tc, which corresponds to the time it takes for the membrane to move a distance C, can be calculate if the rate of movement of the membrane 10 is known or measured. If the rate of movement of the membrane 10 is a constant X (in distance (m)/time (seconds)), then tc equals the distance C divided by the rate X (i.e. C/X), for example. If more than two nozzles are to be activated, then the same process may be repeated in a similar fashion for each nozzle, based on the distance between each additional nozzle and the first nozzle.

When one or more of the nozzles reaches either side of the membrane 10, then decision loop P activates a stopping and reversal of the direction step 4 for the movement of the one or more nozzles. This may be determined by a signal from a controller 60, a limit switch 66, a delay timer based on the rate of movement (as before) or a combination of these. For example, if all of the nozzles are disposed on a rigid member, then a signal can be used to stop and reverse direction of movement for all of the nozzles at the same time. Alternatively, each nozzle may be controlled independently.

When one or more of the nozzles reaches a distal surface of the membrane 10, then hot melt extrusion from that nozzle is terminated in a nozzle off step 5. The location of the distal surface in relation to the first nozzle 11 may be determined manually or automatically, using known lengths, sensors, switches or the like. Then, determining the time for stopping extrusion of hot melt from the subsequent nozzles may be determined similarly to the decision to commence the onset of hot melt extrusion, using a time delay based on distance between the first nozzle and subsequent nozzles and the rate of movement of the membrane 10, for example. When all of the nozzles are turned off, then the method of making a membrane with a pattern of continuous, raised polymer strands that extend from one side of the membrane of the house wrap to an opposite side of the membrane, as a wavy, intersecting pattern on a surface of the membrane is ended, step E.

In one example, a set of rollers or a wheel is used for flattening a portion of a filament. In this method, the wheels may be set up manually or using position controllers prior to the onset of laying filaments onto a surface of the membrane, for example. Alternatively, the height above the membrane and transverse positioning may be controlled during the process of extruding hot melt from the nozzles.

Figure 7:
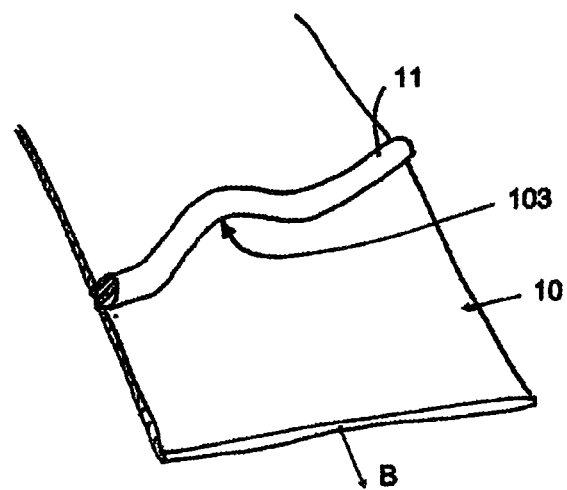
FIG. 7 illustrates a perspective, detailed view of a portion of a serpentine pattern, showing a raised portion of the filaments that forms a bridge and viaduct.
Figure 8:
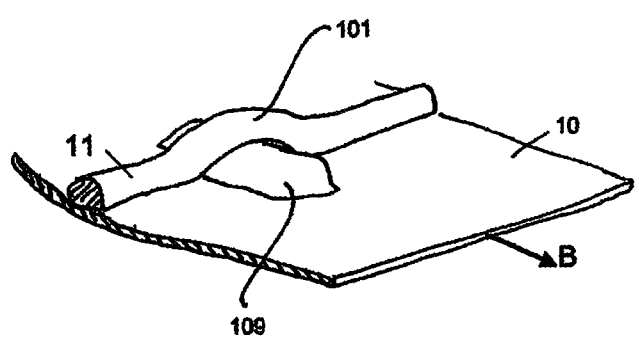
FIG. 8 illustrates an example of one step in a method of producing a bridge and viaduct.

In an alternative example, instead of causing depressions in the filaments, using wheels or rollers, a process may raise portions 101 of the filaments 11 (referred to as "bridges") to extend above the surface of the membrane, as illustrated in FIGS. 7 and 8, leaving an opening 103 (referred to a "via" or "viaduct") under each of the bridges 101, for example. For example, the raised portions 101 may be provided by raising the nozzles or slowing the extrusion of hot melt through the nozzles at certain positions along the path of the nozzle, leaving a gap between the filament 11 and the membrane 10. This may introduce "bridges" of hot melt, if the hot melt is extruded at a temperature where the hot melt does not readily slump to the the underlying surface, without leaving a gap. This may be controlled by temperature and pressure of the hot melt nozzle, for example, in addition to raising or reducing the extrusion rate of the hot melt from the nozzle. The channel or slit (referred to as a "via" or "viaduct") below the bridge provides for water drainage under the filament, for example. In some cases, a hot melt nozzle may need to be raised, such as to create a bridge or when one nozzle crosses a filament of another nozzle, at an intersection point. Determining the need to raise a nozzle, if raising of a nozzle is provided in the control mechanism, may be implemented using an optical or infrared imager, for example. For example, an infrared imager could detect residual heat of the extruded hot melt. Alternatively, if the nozzle is raised during the step of stopping and reversing direction 4, then the raising and re-lowering of a nozzle or nozzles could be controlled as part of the sequence for stopping and reversing direction 4. As another alternative, raising and lowering of a nozzle when a nozzle crosses a filament laid by a preceding nozzle or a soluble viaduct material may be controlled by a proximity sensor, wherein the proximity sensor is disposed in advance of the nozzle and is used for controlling the raising and lowering of the nozzle based on the distance between the proximity sensor and the nozzle and the rate of movement of the membrane (as before), for example.

In one example, a soluble viaduct material 109 may be provided on the surface of the membrane 10, such as a bead of sugar, and a hot melt filament 11, which is not soluble in a solvent, such as PUR, could be deposited over the viaduct material 109, as illustrated schematically in the detailed view of FIG. 8, for example. Subsequently, the viaduct material 109 may be dissolved by a solvent spray or dipping in a solvent, such as water or alcohol, to remove the viaduct material 109, leaving a viaduct 103 under a bridge 101 of solidified hot melt, for example. Other material and solvent combinations may be used to create the bridge and viaduct, without limiting the invention. In any case, the surface could be sprayed with a solvent or dipped in a solvent that dissolves the soluble substance, while leaving the bridge in place, after an insoluble filament or ribbon is solidified and bonded to the membrane, except where the viaduct material has formed a viaduct under the filament. In one alternative example, non-stick rods are disposed along the borders and deployed with linear actuators such that each rod 105 is disposed where a nozzle is located and each rod 105 is extended and withdrawn, mechanically, when a nozzle 43 is disposed over the rod 105. In one example, the rods 105 are made of a non-stick material, such as Teflon, or have a non-stick coating. In one example, the rod 105 is cooled by a thermoelectric cooler or a cooling liquid or gas, further increasing the rate of solidification of the filament.

In one example, condensation or water penetrating through a facing material and to a membrane 10 is diverted from a seam 120 (or edge of membrane) between membranes by a gap 124 or a viaduct 121 of a raised portion of a filament. The liquid 123, 124 is directed along a raised filament to a viaduct 125 away from the seam 120 by following along the filament 11.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A house wrap comprises:
   a membrane having a beginning, an end, a first side extending between the beginning and the end, and a second side, opposite of the first side, the second side extending between the beginning and the end, the beginning, the first side, the end and the second side defining a perimeter, the perimeter defining a surface area of the membrane, and the surface area of the membrane comprises a top surface and a bottom surface, opposite of the top surface; and a pattern of a plurality of wavy, intersecting and raised polymer strands adhered to the top surface of the membrane and raised above the top surface of the membrane, each of the plurality of wavy, intersecting and raised polymer strands comprising a polymer strand extending between the first side of the membrane and the second side of the membrane, at a first angle, such that an initial portion of the polymer strand nearest to the first side of the membrane is at a distance from the end of the membrane greater than a portion of the polymer strand nearest to the second side of the membrane, and the portion of the polymer strand nearest to the second side of the membrane forms a local minima, reversing direction of the polymer strand back toward the first side of the membrane at a second angle in a direction away from the local minima, whereby the polymer strand of each of the plurality of wavy, intersecting and raised polymer strands appears wavy, and each of the plurality of wavy, intersecting and raised polymer strands are offset one from the other by an offset starting distance such that each of the wavy, intersecting and raised polymer strands intersect with each of the other wavy, intersecting and raised polymer strands at intersection points, each of the intersection points being defined by the crossing of the polymer strand of one of the plurality of wavy, intersecting and raised polymer strands and the polymer strand of another of the plurality of wavy, intersecting and raised polymer strands, whereby the plurality of wavy, intersecting and raised polymer strands form the pattern of the plurality of wavy, intersecting and raised polymer strands, and wherein a water drainage channel is provided by a gap along a length of the polymer strand of at least one of the plurality of wavy, intersecting and raised polymer strands, while the pattern of the plurality of wavy, intersecting and raised polymer strands remains continuous from a location where the pattern begins adjacent to the beginning of the membrane to a location where the pattern ends adjacent to the end of the membrane.

2. The house wrap of claim 1, wherein the pattern of the plurality of wavy, intersecting and raised polymer strands comprises a bridge defined by a length of a portion of the polymer strand raised above the top surface of the membrane, a space between the bridge of the polymer strand and the top surface of the membrane defining the gap of the such that a water drainage channel.

3. The house wrap of claim 1, wherein the plurality of wavy, intersecting and raised polymer strands comprises four polymer strands.

4. The house wrap of claim 1, wherein a subsequent portion of the polymer strand extending toward the first side of the membrane reverses direction of the polymer strand back toward the second side of the membrane, defining a local maxima.

5. The house wrap of claim 4, wherein the second angle is defined by the intersection between an imaginary line extending normal to the second side through the local minima of the polymer strand and an imaginary line extending from the local minima to the local maxima, and the second angle is selected in a range from 10 degrees to 50 degrees.

6. The house wrap of claim 5, wherein the second angle is selected in a range from 20 to 40 degrees.

7. The house wrap of claim 1, wherein the pattern is defined by a closed geometric shape, wherein three intersection points define three vertices of the geometric shape, a left vertex, a center vertex and a right vertex, and an arc opposite of the center vertex closes the geometric shape.

8. A house wrap comprises:
a membrane having a beginning, an end, a first side extending between the beginning and the end, and a second side, opposite of the first side, the second side extending between the beginning and the end, and the beginning, the first side, the end and the second side defining a perimeter, the perimeter defining a surface area of the membrane, and the surface area of the membrane comprises a top surface and a bottom surface, opposite of the top surface; and a pattern of a plurality of wavy, intersecting and raised polymer strands adhered to the top surface of the membrane and raised above the top surface of the membrane, each of the plurality of wavy, intersecting and raised polymer strands comprising a polymer strand extending between the first side of the membrane and the second side of the membrane, at a first angle, such that an initial portion of the polymer strand nearest to the first side of the membrane is at a distance from the end of the membrane greater than a portion of the polymer strand nearest to the second side of the membrane, and the portion of the polymer strand nearest to the second side of the membrane forms a local minima, reversing direction of the polymer strand back toward the first side of the membrane at a second angle in a direction away from the local minima, whereby the polymer strand of each of the plurality of wavy, intersecting and raised polymer strands appears wavy, and each of the plurality of wavy, intersecting and raised polymer strands are offset one from the other by an offset starting distance such that each of the wavy, intersecting and raised polymer strands intersect with each of the other wavy, intersecting and raised polymer strands at intersection points, each of the intersection points being defined by the crossing of the polymer strand of one of the plurality of wavy, intersecting and raised polymer strands and the polymer strand of another of the plurality of wavy, intersecting and raised polymer strands, whereby the plurality of wavy, intersecting and raised polymer strands form the pattern of the plurality of wavy, intersecting and raised polymer strands, wherein a water drainage channel is provided for water drainage by a length of a comparatively flattened portion of the polymer strand of at least one of the plurality of wavy, intersecting and raised polymer strands.

9. The house wrap of claim 8, wherein the pattern is continuous pattern of interconnecting polymer strands from a location that begins near the beginning of the membrane to a location that ends near the end of the membrane.

10. The house wrap of claim 8, wherein the length of the comparatively flattened portion of the polymer strand is disposed at the local minima, whereby a path for water drainage is provided at the local minima.

11. A house wrap comprises:
a membrane having a beginning, an end, a first side extending between the beginning and the end, and a second side, opposite of the first side, the second side extending between the beginning and the end, and the beginning, the first side, the end and the second side defining a perimeter, the perimeter defining a surface area of the membrane, and the surface area of the membrane comprises a top surface and a bottom surface, opposite of the top surface; and a pattern of a plurality of wavy, intersecting and raised polymer strands adhered to the top surface of the membrane and raised above the top surface of the membrane, each of the plurality of wavy, intersecting and raised polymer strands comprising a polymer strand extending between the first side of the membrane and the second side of the membrane, at a first angle, such that an initial portion of the polymer strand nearest to the first side of the membrane is at a distance from the end of the membrane greater than a portion of the polymer strand nearest to the second side of the membrane, and the portion of the polymer strand nearest to the second side of the membrane forms a local minima, reversing direction of the polymer strand back toward the first side of the membrane at a second angle in a direction away from the local minima, whereby the polymer strand of each of the plurality of wavy, intersecting and raised polymer strands appears wavy, and each of the plurality of wavy, intersecting and raised polymer strands are offset one from the other by an offset starting distance such that each of the wavy, intersecting and raised polymer strands intersect with each of the other wavy, intersecting and raised polymer strands at intersection points, each of the intersection points being defined by the crossing of the polymer strand of one of the plurality of wavy, intersecting and raised polymer strands and the polymer strand of another of the plurality of wavy, intersecting and raised polymer strands, whereby the plurality of wavy, intersecting and raised polymer strands form the pattern of the plurality of wavy, intersecting and raised polymer strands, and wherein the pattern of the plurality of wavy, intersecting and raised polymer strands comprises a bridge defined by a length of a portion of the polymer strand raised above the top surface of the membrane wherein a water drainage channel is provided by a gap between the bridge of the polymer strand and the top surface of the membrane, and wherein the bridge is formed by depositing a water soluble substance on the top surface of the membrane prior to depositing a portion of the polymer strand over the water soluble substance, and the gap is formed, in situ, when water dissolves the water soluble substance before, during or after installation of the house wrap on the wall of a house.

* * * * *